United States Patent [19]

Wunder et al.

[11] Patent Number: 4,903,562

[45] Date of Patent: Feb. 27, 1990

[54] BALE CUTTING CHAIN

[75] Inventors: Brian C. Wunder, Vancouver, Wash.; Rolland E. Talbot, Guelph, Canada

[73] Assignee: Blount, Inc., Portland, Oreg.

[21] Appl. No.: 246,357

[22] Filed: Sep. 19, 1988

[51] Int. Cl.[4] .......... A01F 29/00

[52] U.S. Cl. .......... 83/833; 83/830; 83/808; 414/308; 30/383

[58] Field of Search .......... 83/831, 832, 833, 834, 83/830, 808; 414/308; 30/381, 383

[56] References Cited

U.S. PATENT DOCUMENTS

| | | | |
|---|---|---|---|
| 2,515,550 | 7/1950 | Ciba | 83/834 |
| 3,144,059 | 8/1964 | Oehrli | 83/833 |
| 3,618,649 | 11/1971 | Benno | 83/808 X |

FOREIGN PATENT DOCUMENTS

| | | | |
|---|---|---|---|
| 1030987 | 5/1958 | Fed. Rep. of Germany | 83/832 |

*Primary Examiner*—Donald R. Schran
*Attorney, Agent, or Firm*—Robert L. Harrington

[57] ABSTRACT

A hay bale cutting chain with each pair of side links including a cutting link. The chain is without any protrusions other than the cutter portions, e.g. depth gauges and bumper portions are eliminated. The cutting edge, from a side view, is substantially vertical, and the side plate configuration is otherwise without a hook angle. The top plate is terminated short of the chain's mid-point to allow long strands that can get trapped under the top plates of the cutting links to escape. The chain is a small pitch chain, e.g. three-eights inch pitch, and drive at a rapid speed so that small bits are removed that more closely simulate sawdust than wood chips as in typical wood cutting.

4 Claims, 1 Drawing Sheet

BALE CUTTING CHAIN

FIELD OF INVENTION

This invention relates to a saw chain for cutting tightly compacted bales of hay, straw and the like, and more particularly to a saw chain having a combination of features particularly designed for bale cutting as differentiated from wood cutting.

BACKGROUND OF THE INVENTION

Many patents have been issued on saw chain and cutting teeth for saw chains for cutting wood. The action of a cutting tooth cutting through the wood fibers of a tree or log have been studied and restudied in order to attain the best cutting chain for that purpose. The objective of the present cutting chain is to cut up bales of hay as an aid to the cattle raising farmer.

Whereas one may assume that cutting hay bales would be a simple process for a wood cutting chain, such is not the case. Hay is comprised of long grass or hay strands, small in diameter, flexible and with a low point of combustion. Hay bales often are formed by rolling the grass strands into a large, e.g. six feet in diameter, tightly compacted mass that is tied together. The bales are stored in that form until many months later, generally in the winter, when they are taken out of storage to a cattle feeding lot, and then broken apart for feeding. The problem encountered is that the hay has become molded into the shape of the bale and simply untying the bale does not accomplish the loosening of the hay as required for feeding.

The apparent answer is to cut the bale apart. The seemingly optimum cutting tool for this purpose is a chain saw. However, prior to the present invention, the chain saw equipped with any of the dozens of wood cutting chains available, have not provided a satisfactory solution.

A hay bale is like wood in at least one respect. Cutting through the hay bale is not easily done with a slicing action like that of a knife. It requires a trenching action like that of a saw. That is, material must be removed to generate a kerf that permits the entry of the cutting tool.

In many other respects, cutting a hay bale is not like cutting a log. The wood fibers in a log are always aligned in the same direction and they are adhered together. The cutting tooth of a saw chain the wood during the trenching action in the form of chips that are flung out and away from the cutting teeth of the saw. The grass strands of a hay bale are criss-crossed throughout the bale and they are not adhered together except by simple compression. As strands of grass are cut, they are freed of the bale and separated from other strands. In the conventional wood cutting chain, some of these strands become captured in and around the components of the saw chain and carried back into the chain saw housing. The strands could build up in the housing and cause plugging and ultimately a fire hazard.

Prior attempts to solve the problem have included modifying the cutting tooth configuration by sloping the cutting edge rearwardly, to simulate a slicing action. This reduces the likelihood of grass strands getting caught up on the cutting edge, but does not eliminate the problem. Furthermore, it creates difficulty in cutting. The side plate cutting edge which cuts the side walls of the kerf acts like a ramp and the operator must exert considerable inward force to make the cutting chain cut.

Other modifications have been tried and abandoned and the outcome is that prior to the present invention, no one has conceived of a satisfactory cutting chain for cutting hay bales.

SUMMARY OF THE PRESENT INVENTION

The present invention was developed out of a combination of theories relating to hay bale cutting. Whereas hay may be easy for a cutting chain to sever, it is this ease of cutting that is believed to cause at least some of the problem of the hay or grass strands getting caught up in the chain saw. A cutting chain too readily cuts through a thickness of the hay bale and the cutters pull out the long strands that get hung up in the chain. Bumper links having vertically projected guard portions, and depth gauges used in conventional wood cutting chains, do not prevent the deep cutting action and occurrence of long strands and instead add to the problem. Sloped side plate cutting edges don't prevent the undesired hooking and urge the cutters to ride up the side walls of the kerf requiring additional manual pressure and increased difficulty in controlling the cutting depth.

The solution of the present invention is to remove the material for generating the kerf by pulverizing that material. This is accomplished by running the cutting chain at a fast rate, e.g. 4,000 feet per minute and providing a cutting tooth at each pair of side links (referred to as a full house cutting chain). The cutting chain is preferably of a small pitch, e.g. $\frac{3}{8}$" pitch chain so that the crowded sequence of cutting links, in cooperation, rapidly cut the material in the form of tiny bits.

The configuration of the cutting edge will be described as if the chain is in the upright position as shown in the drawings. However, the orientation of the chain during cutting can be at any angle and typically directed downwardly, i.e. inversely to that shown in the drawings. The cutting edge is preferably curved from its outer most position at the side of the chain (determining the width of the cut) to its outer most position at the top of the chain. A short straight cut by the cutter's top plate cutting edge, e.g. a raker type cut, is deemed more likely to cut out longer strands than a longer curved cutting edge provided by the combined side plate and top plate cutting edges. Thus, the curved cutting edge is preferable. The latter will facilitate cutting the material as tiny bits as will be further explained in the detailed description having reference to the drawings.

The second theory is to avoid protrusions that will grab onto and carry any of the longer hay or grass strands that may escape the cutting action of the cutting edges. The side plate portions that may contact the side wall of the kerf is not to be swept back because it functions like a ramp to urge the cutter out of the kerf and forces the operator to exert pressure, increasing the problem of controlling depth of cut. Yet, the side plate configuration should not provide the aggressiveness of a wood cutting chain with the outer portion of the side plate leading edge projected forwardly. The side plate portion of the present chain is preferably substantially vertical and thus perpendicular to the direction of cut. The portions that do not contact the side walls of the kerf may, however, be appropriately swept back. This offers the least opportunity for the cutter blades to themselves unduly contribute to the strand grabbing problem while also producing the desired cutting action.

Depth gauges and bumper guard portions are eliminated as being likely candidates for hooking onto grass strands. At the very least, they impede the escape of these strands from the confines of the chain.

Perhaps more important for the accomplishment is the design of the top plate. The top plate of a "hooded type" wood cutting chain is projected laterally outwardly, for cutting the width of the kerf, and then back over the body of the chain, overlapping the mid-point thereof, for cutting the bottom of the kerf. Thus, left and right hand cutting links have overlapping cutting edges when viewed along an axial line. The reason is that wood fibers are adhered to each other and simply severing these fibers at two points does not free the intermediate portion from the wood mass. Thus, the wood materials must be cut out of the log, i.e. in the form of chips.

Hay strands, however, are not adhered to other strands in the bale and thus this overlap of cutting edges is not required. Moreover, the overlapping cutter portions in prior wood cutting chains form an enclosure that would inhibit the long strands from escaping the chain. Thus, the top plates of the cutters of the preferred embodiment herein do not overlap the midpoint of the chain. The space between the top plates is kept small because this spacing, to some extent, determines the length of the strands being cut in the crosswise direction. Nevertheless, there is a spacing and that spacing enables errant longer strands to escape.

The above theories have been tested and indeed the cutting chain of the invention has been found to produce a bale cutting chain superior to any known prior chains designed or modified for that purpose.

THE PRIOR ART

Literally hundreds of hooded type chain configurations have been designed over the years. However, none are provided with the features of the present invention for optimum hay bale cutting. From simply an appearance point of view, the saw chain depicted in U.S. Pat. No. 3,625,266 appears to be the most pertinent. The cutter configuration is not discussed in the patent and the rational behind the configuration appears to be nothing more than an artists casual rendition of his concept of a saw chain cutter configuration. The invention that is taught by the patent is a special top plate having a configured rear end portion that enhances ejection of the wood chips.

The ejection feature may or may not work for wood chips, but without question would be an impediment to removal of hay strands. The overlap of the left and right hand cutting link top plates is contrary to the teaching of the present invention. The vertical side cutting plate can be viewed as nothing more than an incidental and non-intended disclosure as such a cutting link for wood cutting is unsatisfactory and wood cutting is the function for the chain disclosed in the patent. In any event, this patent teaches a skip tooth chain with traditional depth gauges preceding the cutters. For all of these reasons the above mentioned patent is deficient as a reference for anticipating the present invention.

Reference is now made to the detailed description and drawings wherein.

Figure 1:
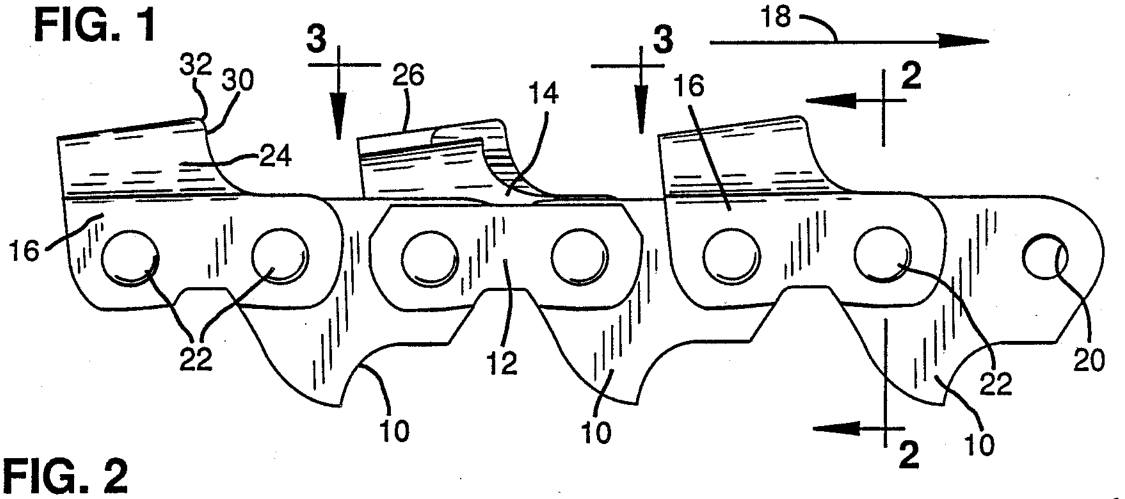
FIG. 1 is a side view of the saw chain in accordance with the present invention.

Referring to the drawings, FIG. 1 illustrates the sequence of saw chain links including alternating center links 10 pivotally connected, front and rear, to pairs of side links. The pairs of side links consist of a tie strap 12 on one side and a cutting link on the other side. The cutting links alternate between left hand cutting links 14 and right hand cutting links 16 (left and right being determined by facing the direction of travel indicated by arrow 18).

The center links 10 include depending drive tangs that are engaged by a drive sprocket as the chain passes through the chain saw housing. These components are typical for wood cutting chains as are the tie straps 12. However, what is not typical to wood cutting chains is that every pair of side links includes a cutting link 14 or 16. It is not unknown for wood cutting chain to have every pair of side links include a cutting link, but it is also not considered necessary and often considered detrimental.

A saw chain wherein each pair of side links include a cutting link is referred to as a full house saw chain arrangement. For the present invention this full house arrangement is considered highly desirable.

Figure 3:
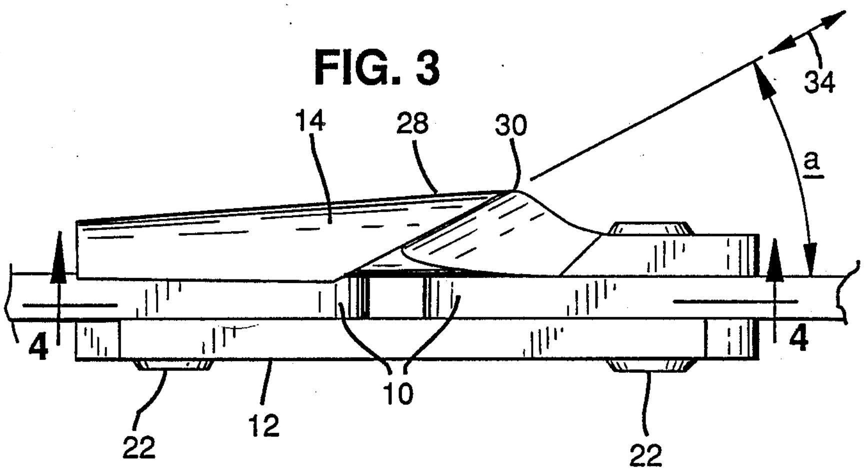
FIG. 3 is an enlarged top view of a segment of the saw chain as taken on view line 3—3 of FIG. 1.
Figure 4:
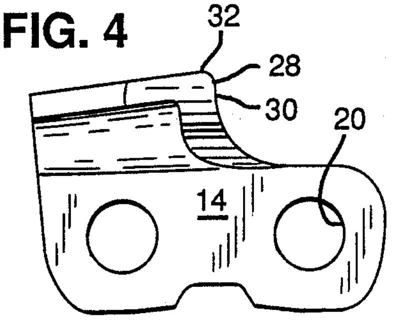
FIG. 4 is a reduced side elevation view of the cutter link of FIG. 3 as taken on view line 4—4.

The left and right hand cutting links are merely mirror images of one another. This will be apparent from FIG. 2 wherein the right hand cutting link is shown in the foreground and the left hand cutting link 14 follows. (Note the view lines in FIG. 1) FIGS. 3 and 4 illustrate a left hand cutting link 14 but it should be understood that the entire description therefore is equally applicable to the right hand cutting links 16.

The cutting link 14 is comprised of a substantially planar lower body portion that resembles the tie strap 12. Rivet holes 20 on the front and rear of the body portion of all of the links allow for insertion of rivets 22 to provide for pivotal connection as between the center links and pairs of side links. The rivets also secure the side links together, but in a manner that permits pivoting relative to the center links.

The portion of the cutting link that extends upwardly from the body portion is the cutter portion consisting of a side plate 24 and top plate 26. The side plate 24 is bowed, or curved, outwardly and laterally from the plane of the body portion and back over the body portion. The top plate 26 continues over the body portion and terminates at a point short of the midpoint of the overall thickness of the saw chain as will be particularly noted in FIG. 2.

The outermost leading edge of the side plate, top plate combination is sharpened to form a primary leading cutting edge 28 that extends from the lateral outermost point 30, to the vertical outermost point 32. The top plate cutting edge continues from point 32, projected rearwardly therefrom at an acute angle a (see FIG. 3) of about 30 degrees. This acute angle and the cutting edge face forming cutting edge 28 are to receive and be sharpened by a round file projected across the cutting edge face in the direction of angle a and moved axially in the direction indicated by arrow 34.

The side view of the cutting edge from points 30 to 32 is substantially perpendicular to the axis of the chain, as can be seen from FIGS. 1 and 4. The leading edge of the cutter portion below the cutting edge, i.e. below point 30 is also shown to be perpendicular to the axis in part and curved downwardly and forwardly in part, but notably it does not form a positive hook angle as in wood cutting chains, i.e. curved downwardly and rearwardly from a leading edge.

Figure 2:
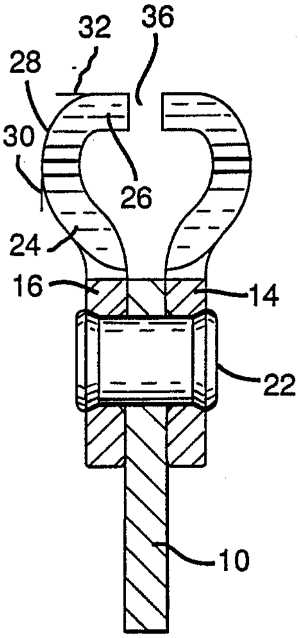
FIG. 2 is an enlarged front view of the saw chain as taken along view line 2—2 of FIG. 1.

Also to be noted is the absence of any depth gauge preceding the cutter portion, and most importantly it is to be noted that the top plate 26 of the successive left and right hand cutters do not overlap (see FIG. 2). A space 36 is maintained between the innermost position of the respective left and right hand top plates. Preferably, this space is established to be about 0.030 inch plus or minus 0.005 inch.

OPERATION

The benefits of the bale cutting chain of this invention will be appreciated from an understanding of its operation in the cutting of a kerf through a hay bale.

Figure 5:
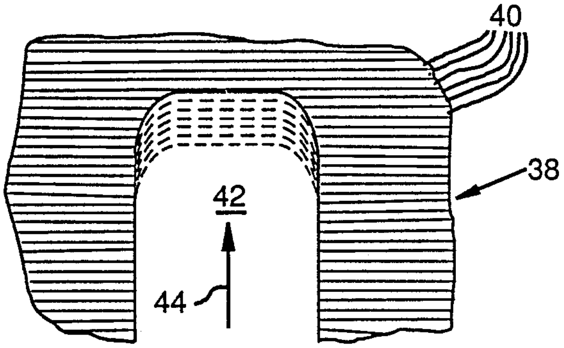
FIG. 5 is a schematic view illustrating the cutting action of the saw chain of FIG. 1 in cutting a hay bale.

Referring to FIG. 5, illustrated is a section of a hay bale 38 comprised of compressed or packed strands 40 of hay or grass. A kerf 42 is formed in the bale by a left and right hand cutting edges 28 which in FIG. 5 are cutting upwardly through the bale 38 as indicated by arrow 44. The reader will understand that the cutting direction can be sideward or more typically downward as well.

The cutting chain is driven at a high rate of speed e.g. 4,000 feet per minute. Each succeeding cutting link takes a small but increasingly deeper bite into the hay bale as illustrated by the dashed cutting lines. Because the cutting edge 28 is curved whereas the strands 40 are substantially straight, each cut severs a tiny portion of a plurality of the strands. In succeeding cuts, the previously cut strands are simply cut back in increments until they are cut back to the side wall of the kerf, i.e. note the dash lines of FIG. 5.

The opposed cutter portions of the left and right cutting links do not overlap but the space 36 between them is sufficiently small so that the segments that are cut out are not long enough to get hung up in the chain. The result is that the major portion of material that is removed in generating the kerf 42 is more typical of saw dust in size than saw chips such as removed by wood cutting chain.

There is, of course, a small percentage of grass or hay strands that lie at such an angle in the bale as to avoid being pulverized. These strands or long segments need to be freed of the trappings of the saw chain components. The dust size particles, of course, cause no problem as they are simply blown away from the chain as the chain travels around the guide bar. The large strands have been the bane of prior bale cutting chains as they become wrapped around the chain components and get carried into the chain saw housing.

In the present invention the trapping of long strands in the saw chain is largely avoided by a combination of features. There are no upwardly projected components that are forwardly directed, i.e. the side plate leading edge throughout its entire height is vertical or rearwardly and upwardly curved. The cutting edge portion thereof is substantially vertically oriented in a manner so as to avoid a positive hooking action, but also to avoid any significant ramping action that would urge the cutting chain out of the kerf (through engagement of the cutting edge with the side wall of the kerf).

Depth gauges and bumper guard portions, both considered desirable for wood cutting chains, are eliminated. The presence of these projections has been found to impede the escape of the longer strands. Finally, the spacing or gap between the top plates allows the strands to slide outwardly of the chain and between the cutters.

This combination of features, including both that which has been avoided as well as that which has been included, in considered to have provided the successful design for a bale cutting chain. The invention is specifically defined in the claims appended hereto and the above described embodiment is but an example of the preferred embodiment of the invention and does not limit the scope thereof.

We claim:

1. A bale cutting saw chain for portable hand held chain saws comprising;

- a sequence of chain links including alternating center drive links and pairs of side links, one of said side links of every pair of side links being a cutting link and alternating between left and right hand cutting links;
- said cutting links each having a substantially planar body portion and an upwardly projected cutter portion, and said cutting links and the remainder of links in the chain sequence otherwise being devoid of upper projections extending above the planar body portions of the cutting links, said upwardly projected cutter portion including a side plate that on progressing upwardly from said body portion is curved laterally outwardly from the plane of the body portion and then back toward the plane of the body portion, a top plate proceeding from the side plate to terminate at a point substantially over the body portion and short of the midpoint of the overall thickness of the saw chain, said side plate and top plate defining in combination a leading cutting edge extending from the laterally outermost position of the saw chain and continuing to the vertical outermost position of the top plate, and said side plate cutting edge being substantially perpendicular in side view to the axis of the chain.

2. A bale cutting saw chain as defined in claim 1 wherein the spacing between the top plates of left and right hand cutting links when viewed axially of the chain length is at least about 0.030 inch.

3. A bale cutting saw chain as defined in claim 1 wherein the leading cutting edge of the top and side plates form a continuous curve whereby bits of hay strands from numerous hay strands are being cut with each pass of a cutting link.

4. A bale cutting saw chain as defined in claim 3 wherein the cutting links are spaced in close sequential proximity in a saw chain having a pitch of about three-eights inch.

* * * * *